O. P. DILS.
Wheel-Plow.
No. 62,615.  Patented Mar. 5, 1867.
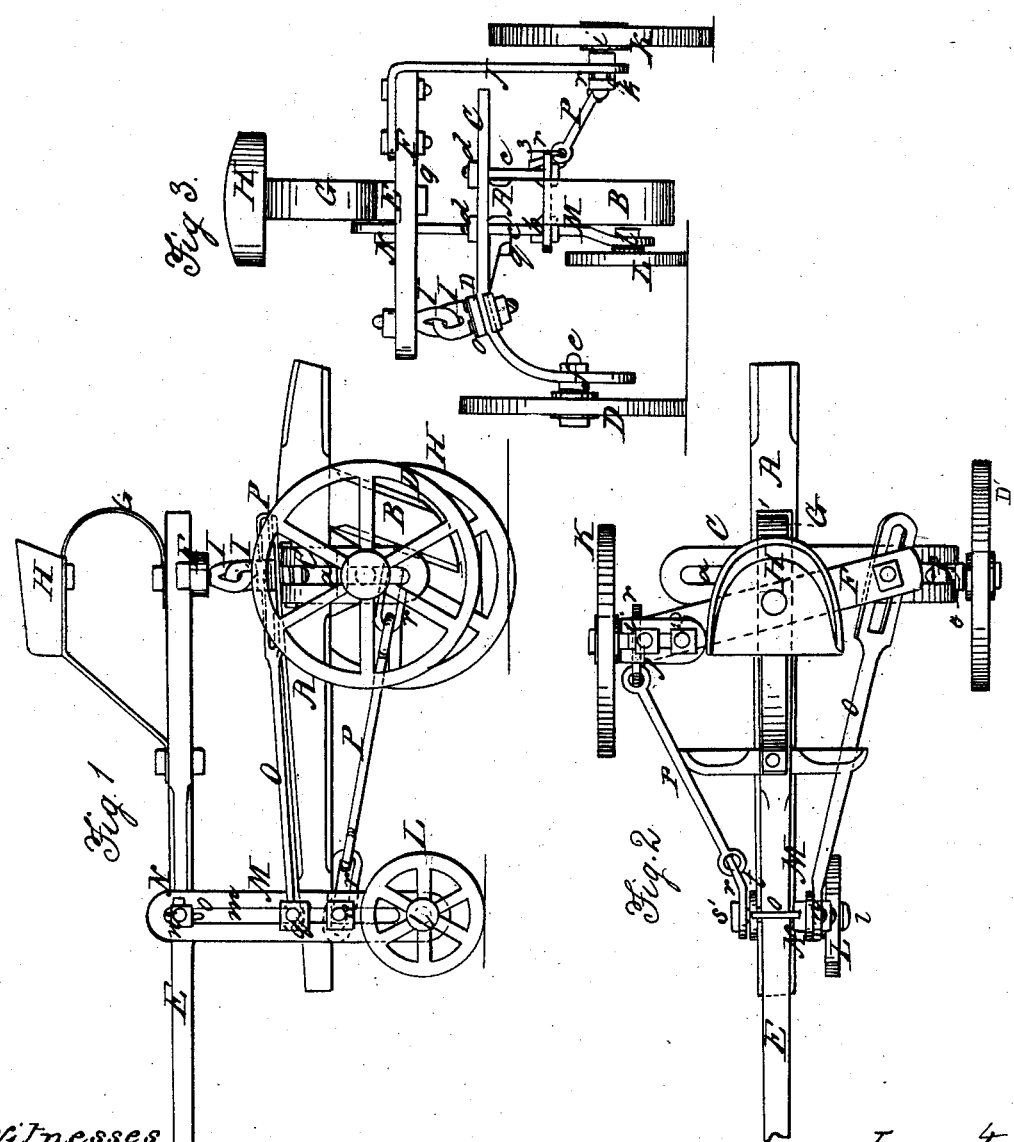

United States Patent Office.

O. P. DILS, OF FALMOUTH, KENTUCKY.

Letters Patent No. 62,615, dated March 5, 1867.

IMPROVEMENT IN SULKY-PLOUGHS.

The Schedule referred to in these Letters Patent and making part of the same.

TO ALL WHOM IT MAY CONCERN:

Be it known that I, O. P. DILS, of Falmouth, in the county of Pendleton, and State of Kentucky, have invented a new and improved Sulky-Plough; and I do hereby declare that the following is a full, clear, and exact description thereof, which will enable others skilled in the art to make and use the same, reference being had to the accompanying drawings, forming part of this specification, in which—

Figure 1 is a side view of my invention.

Figure 2, a plan or top view of the same.

Figure 3, a rear view of the same.

Similar letters of reference indicate like parts.

This invention relates to a new and improved riding attachment for ploughs, whereby the driver is provided with a seat on the device, and has full control over the plough. The invention consists in a peculiar construction and arrangement of parts, as hereinafter fully shown and described, whereby both the plough and the carriage or sulky part of the device are allowed to conform perfectly to the inequalities of surface over which they may pass, and an implement of light or easy draught obtained.

A represents a plough-beam, having a standard, B, attached to its rear end, to which a plough is secured, of any proper or desired form, the plough not being shown in the drawings. C represents a metal bar, which is slotted longitudinally, as shown at $a$; said slot extending nearly the whole length of the bar C. This bar is secured transversely to the beam A, just in front of the standard B, by means of a clamp, composed of a bar, $b$, and two screws, $c\ c$, the bar $b$ being at the under side of the beam, and the screw $c$ passing through it and through the slot $a$ of bar C, and having nuts $d$ on their upper ends. The bar C is curved down to a vertical position at its left-hand side, and the axis $e$ of the land-wheel D is secured in the slot $a$ by a screw-nut, $f$, as shown in figs. 2 and 3. E represents the draught-pole, to the rear end of which a bar, F, is attached by a screw-bolt, $g$, the latter passing through an oblong slot in F, and also through the lower end of a spring, G, which supports the driver's seat H. The front spring, upon which the seat rests, is secured by a bolt, which bolt also secures the rest and support for the feet. One end of the bar F is secured by linked bolts I I to the bar C, as shown more particularly in fig. 3; and the opposite end of said bar has a metal bar, J, attached to it, which has a longitudinal slot, $i$, made in it, in which the axis $j$ of the furrow-wheel K is secured by a nut, $k$. L represents a gauge-wheel, the axis $l$ of which is secured in the lower end of an upright bar, M, which has a vertical slot, $m$, made in it. In the upper part of the slot $m$ an eye-bolt, N, is secured by a screw-nut, $n$, and the draught-pole passes through the eye $o$ of the said bolt. O represents a brace-rod, the rear end of which is constructed in link form, as shown at $p$, and is secured to the bar C by the lower link-bolt I. The front end of this brace-rod is attached to the bar M by a screw-bolt, $g$, which passes through the slot $m$. P represents a brace-rod, having a link, $r$, at each end; said links being attached, the front one by a screw-bolt, $s$, to a plate, $t$, and the rear one to the axis $j$ of the furrow-wheel K. The screw-bolts $g\ s$ pass through a plate, $t$, at one side of the beam A, the plate M being at the opposite side. By this means the front end of the plough-beam is supported.

By this arrangement it will be seen that both the forward and land-wheels are allowed to rise and fall independently of each other, and conform to the inequalities of surface over which they may pass, and that the plough also may move and adjust itself to the surface of the ground, as it has a certain degree of play or movement which is sufficient to admit of that result, and the machine may be readily guided, and the draught-pole adjusted at its rear, so as to give more or less "land" to the plough, as may be required.

I claim as new, and desire to secure by Letters Patent—

The arrangement of the draught-pole E and bars F C, with the land and furrow-wheels D K, respectively attached, the brace-rods O P, and plough-beam A, for the purpose of forming a new and improved sulky-plough, as set forth.

O. P. DILS.

Witnesses:
C. H. LEE,
G. C. LIGHTFOOT.